(12) United States Patent
Braun et al.

(10) Patent No.: US 8,365,096 B2
(45) Date of Patent: Jan. 29, 2013

(54) METHOD AND APPARATUS FOR TRANSPARENTLY MAPPING PERSONALIZED ALERT PREFERENCES ONTO THIN CLIENT DEVICES WITH DIFFERING CAPABILITIES

(75) Inventors: Mark R. Braun, Elgin, IL (US); William M. Carey, London (GB); William A. Myers, Buffalo Grove, IL (US); Nitya Narasimhan, Lake Zurich, IL (US); William Reinisch, New York, NY (US); Craig C. Watson, Southampton (GB)

(73) Assignee: Motorola Mobility LLC, Libertyville, IL (US)

( * ) Notice: Subject to any disclaimer, the term of this patent is extended or adjusted under 35 U.S.C. 154(b) by 858 days.

(21) Appl. No.: 11/967,738

(22) Filed: Dec. 31, 2007

(65) Prior Publication Data
US 2009/0172555 A1 Jul. 2, 2009

(51) Int. Cl.
G06F 3/048 (2006.01)
G06F 15/177 (2006.01)

(52) U.S. Cl. ........ 715/825; 715/735; 715/740; 715/744; 715/810; 709/220; 709/221

(58) Field of Classification Search .......... 715/734–736, 715/740, 744, 745, 747, 825
See application file for complete search history.

(56) References Cited

U.S. PATENT DOCUMENTS

| 5,504,476 | A | | 4/1996 | Marrs et al. |
| 5,870,605 | A | * | 2/1999 | Bracho et al. ................. 719/318 |
| 6,459,913 | B2 | | 10/2002 | Clouter |
| 6,538,668 | B1 | * | 3/2003 | Ruberg et al. ................. 715/747 |
| 6,664,979 | B1 | * | 12/2003 | Schofield et al. ............. 715/735 |
| 6,756,998 | B1 | * | 6/2004 | Bilger ............................. 715/764 |
| 6,813,491 | B1 | * | 11/2004 | McKinney ................. 455/414.1 |
| 6,968,216 | B1 | * | 11/2005 | Chen et al. ..................... 455/567 |
| 7,076,255 | B2 | | 7/2006 | Parupudi et al. |
| 7,079,176 | B1 | | 7/2006 | Freeman et al. |
| 7,111,242 | B1 | * | 9/2006 | Grooters ....................... 715/744 |
| 7,137,074 | B1 | * | 11/2006 | Newton et al. ................ 715/835 |
| 7,168,043 | B2 | * | 1/2007 | Shimizu et al. ............... 715/734 |
| 2002/0087649 | A1 | | 7/2002 | Horvitz |
| 2002/0154010 | A1 | | 10/2002 | Tu et al. |

(Continued)

FOREIGN PATENT DOCUMENTS

| EP | 1187467 A2 | 3/2002 |
| KR | 20030080263 | 10/2003 |

(Continued)

*Primary Examiner* — Kieu Vu
*Assistant Examiner* — Eric J Bycer (57) ABSTRACT

A method and apparatus that personalizes preferences for a thin client using custom menus is disclosed. The method may include receiving registering capabilities from the thin client, storing feature list for all devices, generation of a custom alert settings menu based on the thin client's capabilities, storing selected alert settings, and generating a list of all registered devices that have similar alert capabilities as the thin client. The custom menu can be viewed by a user on any device that has display capabilities. The user can select from among the alert settings supported by the thin client or select the alert settings for the thin client that is similar to a registered device. Apparatus is also provided for mapping alert capabilities from the feature list and the received alert preferences from a user. Thin client mapping of mapping of alert type is also provided for processing an alert request from an external device.

19 Claims, 7 Drawing Sheets

U.S. PATENT DOCUMENTS

| | | |
|---|---|---|
| 2002/0188943 A1 | 12/2002 | Freeman et al. |
| 2003/0023975 A1 | 1/2003 | Schrader et al. |
| 2003/0051245 A1 | 3/2003 | Klopfenstein |
| 2003/0054867 A1 | 3/2003 | Dowlat et al. |
| 2003/0079015 A1 | 4/2003 | Fein et al. |
| 2003/0126604 A1 | 7/2003 | Suh |
| 2003/0131143 A1 | 7/2003 | Myers |
| 2003/0149978 A1 | 8/2003 | Plotnick |
| 2003/0169289 A1* | 9/2003 | Holt et al. ............ 345/735 |
| 2003/0233660 A1* | 12/2003 | Slemmer et al. ......... 725/80 |
| 2004/0027377 A1* | 2/2004 | Hays et al. ............ 345/760 |
| 2004/0064830 A1* | 4/2004 | Irving et al. ........... 719/328 |
| 2004/0073918 A1 | 4/2004 | Ferman et al. |
| 2004/0078487 A1* | 4/2004 | Cernohous et al. ....... 709/245 |
| 2004/0225667 A1 | 11/2004 | Hu et al. |
| 2005/0289264 A1* | 12/2005 | Illowsky et al. ......... 710/104 |
| 2006/0123080 A1* | 6/2006 | Baudino et al. .......... 709/204 |
| 2006/0240877 A1* | 10/2006 | Filiba et al. ............ 455/567 |
| 2007/0032225 A1* | 2/2007 | Konicek et al. .......... 455/417 |
| 2007/0077924 A1 | 4/2007 | Bhogal et al. |
| 2007/0113186 A1* | 5/2007 | Coles et al. ............ 715/735 |
| 2008/0134045 A1* | 6/2008 | Fridman et al. .......... 715/735 |
| 2008/0215665 A1* | 9/2008 | Appleby et al. .......... 709/202 |
| 2009/0231128 A1 | 9/2009 | Watson et al. |
| 2009/0254944 A1 | 10/2009 | Watson et al. |

FOREIGN PATENT DOCUMENTS

| | | |
|---|---|---|
| WO | 9717682 A1 | 5/1997 |
| WO | 9901984 A1 | 1/1999 |
| WO | 9962256 A2 | 12/1999 |
| WO | 0169387 A2 | 9/2001 |
| WO | 0176329 A2 | 10/2001 |
| WO | 2006065637 A2 | 6/2006 |
| WO | 2007037870 A2 | 4/2007 |

* cited by examiner

METHOD AND APPARATUS FOR TRANSPARENTLY MAPPING PERSONALIZED ALERT PREFERENCES ONTO THIN CLIENT DEVICES WITH DIFFERING CAPABILITIES

BACKGROUND OF THE INVENTION

1. Field of the Invention

The invention relates to alerts and, more specifically, to registering or personalizing alert preferences onto thin clients.

2. Introduction

A thin client may be a device owned by a user. Thin clients allow users to receive incoming communications while away from conventional means of communication, e.g., landline telephones and/or computers. In single-device solution, users are able to enforce their alert preferences at the single device using a limited set of preferences (given the finite set of capabilities associated with that device). However, in multi-device solutions there are two key problems: 1. The default preferences established by a user on one device may not be applicable to a second device because of a disparity in capabilities (e.g., a visual pop-up alert on one device cannot be replicated on another device that lacks a display). Thus, transferring existing user preferences from one device to the next may be difficult; 2. Requiring the user to manually establish preferences on each device used may not be viable (poor user experience due to input constraints, increased error due to manual entry), particularly if the user needs to change default settings based not on the current device used, but on the current context of operation (e.g., in meeting vs. at desk).

In the Galaxy Family of devices, the user has a Smart Module (SM) modem device and typically two or more Thin Client (TC) devices. At a given time, the user may have a single active Thin Client or multiple active Thin Clients depending on their function (e.g. one may have display and another audio). In the course of a day, the user may switch among different Thin Clients depending on where they are at and what they are doing or any other personal preference. They may have one Thin Client for work with corresponding suitable functions and appearance for the business environment. But they may have different Thin Clients for personal use, working out, a night out, etc., each with varying capabilities.

For example, the devices may have different alert capabilities. Alert capabilities include vibrators, display ("silent mode"), flashing lights, polyphonic ringtones, and video ringtones. Thin Clients may only include a subset of these functions. If the user selects the flashing lights indicator to provide an unobtrusive alerting on their business TC, there is a problem as to which alert to use on their "working out" Thin Client when that becomes the active TC.

It is also cumbersome in a multi-device system to change the alert setting on each active device when temporarily or permanently desiring a new setting. For example, when the user wants an unobtrusive setting for all active Galaxy devices during a meeting, they can manually set their SM to vibrator mode, TC1 to display "silent mode", TC2 to vibrator mode, and TC3 to flashing lights mode. That requires many steps, which will need to be repeated after the meeting to change all devices to the next desired mode.

It will also be necessary to select the settings on a Thin Client with limited UI by using another device. That results in the problem of the user trying to select an alert option that is unavailable on the Thin Client. For example, they user may try to select "vibrator" when only display "silent mode" and polyphonic ringtones are valid options.

For the reasons stated above, and for other reasons stated below which would become apparent to those skilled in the art upon reading and understanding the present specification, there is a need in the art to select preferences that impact multiple devices with minimal user interaction. Further, there is a need in the art for a user to personalized alert preferences using custom menus.

SUMMARY OF THE INVENTION

A method and apparatus that personalizes preferences for a thin client using custom menus is disclosed. The method may include receiving capabilities through thin client registration capabilities from the thin client, storing feature list for all devices, generation of a custom alert settings menu based on the thin clients capabilities, and generating a list of all registered devices that have similar alert capabilities as the thin client. The custom menu can be viewed by a user on any device that has display capabilities. The user can select from among the alert settings supported by the thin client or select the alert settings for the thin client that is similar to a registered device. Apparatus is also provided for mapping alert capabilities from the feature list and the received alert preferences from a user. Thin client mapping of alert type is also provided for processing an alert request from an external device.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns personalizing alert preferences onto Thin Client (TC) devices with differing capabilities in a distributed architecture.

Figure 1:
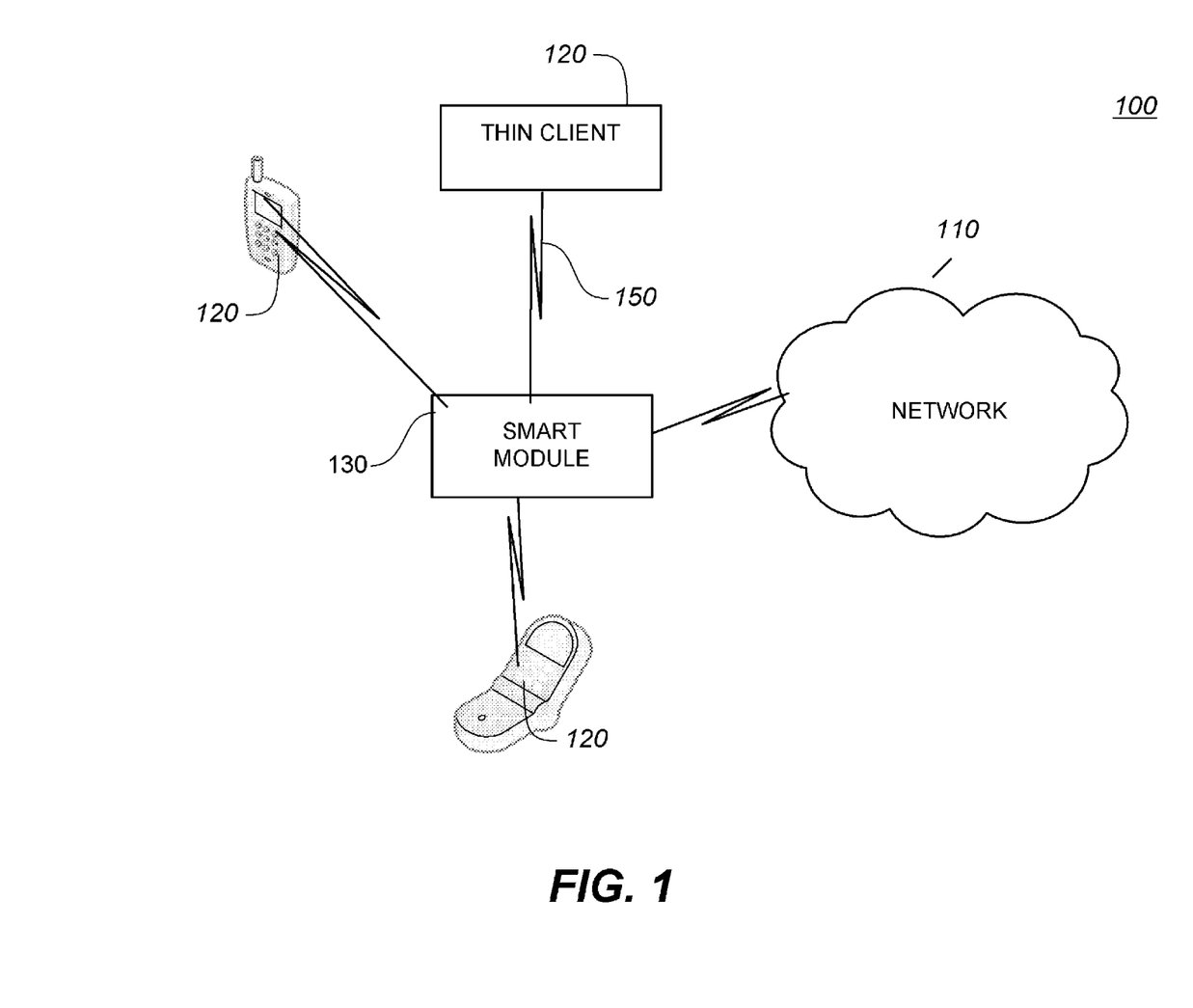
FIG. 1 illustrates an exemplary diagram of interconnected smart module and Thin Clients in accordance with a possible embodiment of the invention.

FIG. 1 illustrates an exemplary diagram of a distributed architecture for personalizing alert preferences 100 in accordance with a possible embodiment of the invention. In particular, the distributed architecture 100 includes a plurality of thin clients 120, a smart module 130, a network connection 110, and a communication link 150.

While FIG. 1 only shows three Thin Clients 120, this example is for ease of discussion as one of skill in the art may appreciate that more than three Thin Clients 120 (or a plurality of Thin Clients) may exist per group in the distributed architecture for personalizing alert preferences 100.

The Thin Client 120 may be a portable MP3 player, satellite radio receiver, AM/FM radio receiver, satellite television, portable music player, portable computer, wireless radio, wireless telephone, portable digital video recorder, display tablet device, keyboard or keypad device, headset, speaker, pointer, cellular telephone, mobile telephone, personal digital assistant (PDA), or combinations of the above, for example.

The communication link 150 is any information transferring mechanism either hardwired, wireless or combination thereof but typically, communication link 150 is a short range wireless channel such as Bluetooth® or WiFi. The Smart Module or Thin Client would properly view the connection as a computer-readable medium when communicating with each other.

The distributed architecture for personalizing alert preferences 100 illustrated in FIG. 1 and the related discussion are intended to provide a brief, general description of a suitable computing environment in which the invention may be implemented. Although not required, the invention will be described, at least in part, in the general context of computer-executable instructions, such as program modules, being executed by the smart module ("SM") 130. Generally, program modules include routine programs, objects, components, data structures, etc, that perform particular tasks or implement particular abstract data types. Moreover, those skilled in the art will appreciate that other embodiments of the invention may be practiced in communication network environments with many types of communication equipment and computer system configurations which operate from batteries, including cellular network devices, Thin Clients, portable computers, hand-held devices, portable multi-processor systems, microprocessor-based or programmable consumer electronics, and the like.

The Thin Client 120 will be described further below in relation to FIG. 2.

Figure 2:
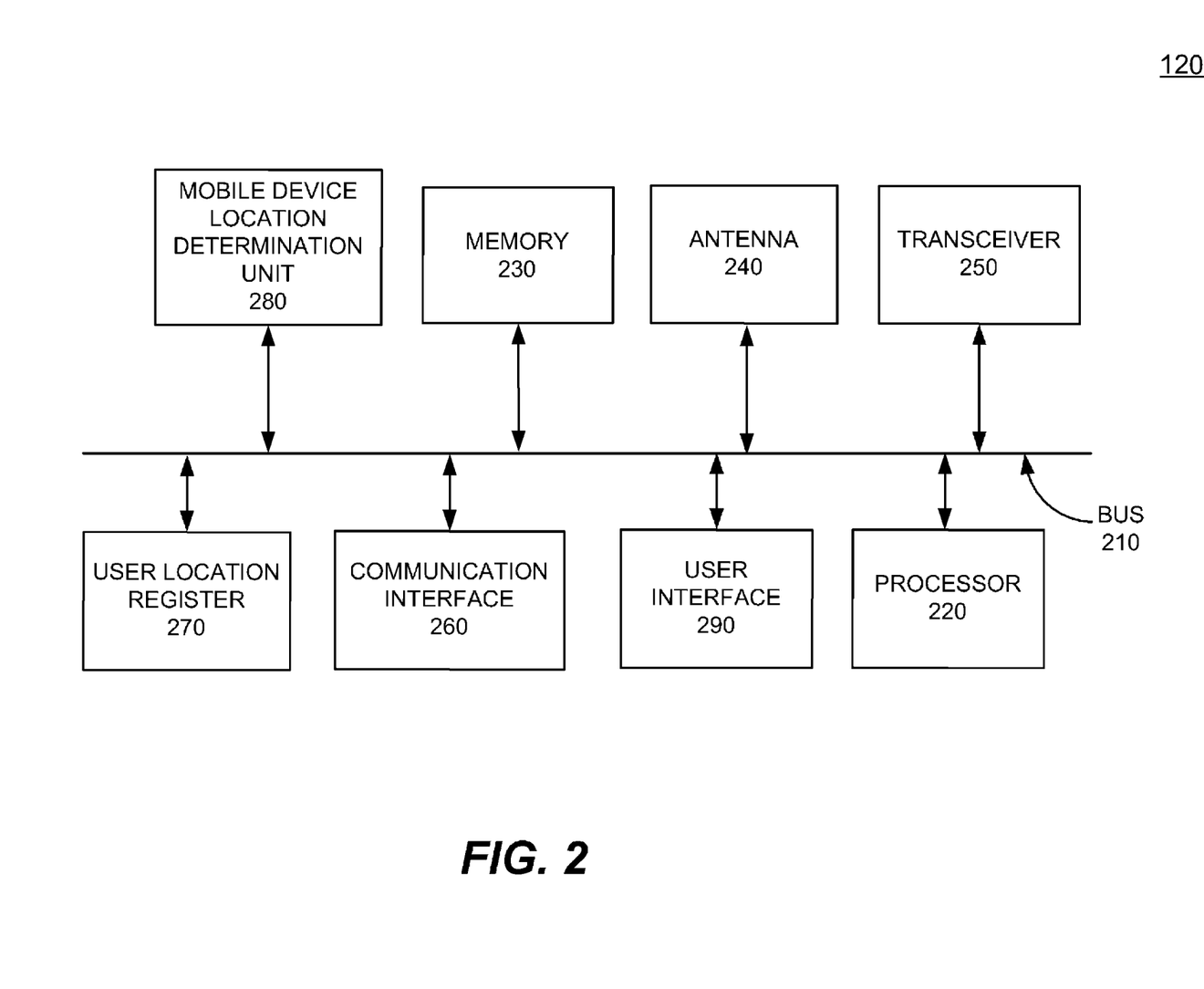
FIG. 2 illustrates a block diagram of an exemplary wireless Thin Client device in accordance with a possible embodiment of the invention.

FIG. 2 shows a more detailed exemplary block diagram of Thin Client 120 of FIG. 1.

The Thin Client 120 may include a bus 210, a processor 220, a memory 230, an antenna 240, a transceiver 250, a communication interface 260, a user location register 270, a wireless device location determination unit 280, and a user interface 290. Bus 210 may permit communication among the components of the Thin Client.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220. Additionally, memory 230 may include any type of media, such as, for example, magnetic or optical recording media and its corresponding drive.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network. The transceiver 250 transmits and receives transmissions via one or more of the antennae 240 in a manner known to those of skill in the art.

Communication interface 260 may include any mechanism that facilitates communication via a network. For example, communication interface 260 may include a modem. Alternatively, communication interface 260 may include other mechanisms for assisting the transceiver 250 in communicating with other devices and/or systems via wireless connections.

User interface 290 may include one or more conventional input mechanisms that permit a user to input information, communicate with the Thin Client, and/or present information to the user, such as a an electronic display, microphone, touchpad, keypad, keyboard, mouse, pen, stylus, voice recognition device, buttons, one or more speakers, etc.

While the Thin Client 120 is shown as an example, one of skill in the art may appreciate that any known or future-developed combination of location determination systems may be used to track the location of the user. The user location register 270 is used to store the locations of the user as determined by the wireless device location determination unit 280 via a global positioning system (GPS) device, for example.

For instance, in one possible manner to perform the user location tracking process, the wireless device location determination unit 280 may periodically record the location of the Thin Client 120 and its user in the user location register 270, at various times. To minimize network load, the user's location/time file and identity information may be uploaded during periods of reduced or idle network traffic, such as the middle of the night, for example.

The Thin Client 120 may perform such functions in response to processor 220 and/or wireless device location determination unit 280 by executing sequences of instructions contained in a computer-readable medium, such as, for example, memory 230. Such instructions may be read into memory 230 from another computer-readable medium, such as a storage device or from a separate device via communication interface 260.

Figure 3:
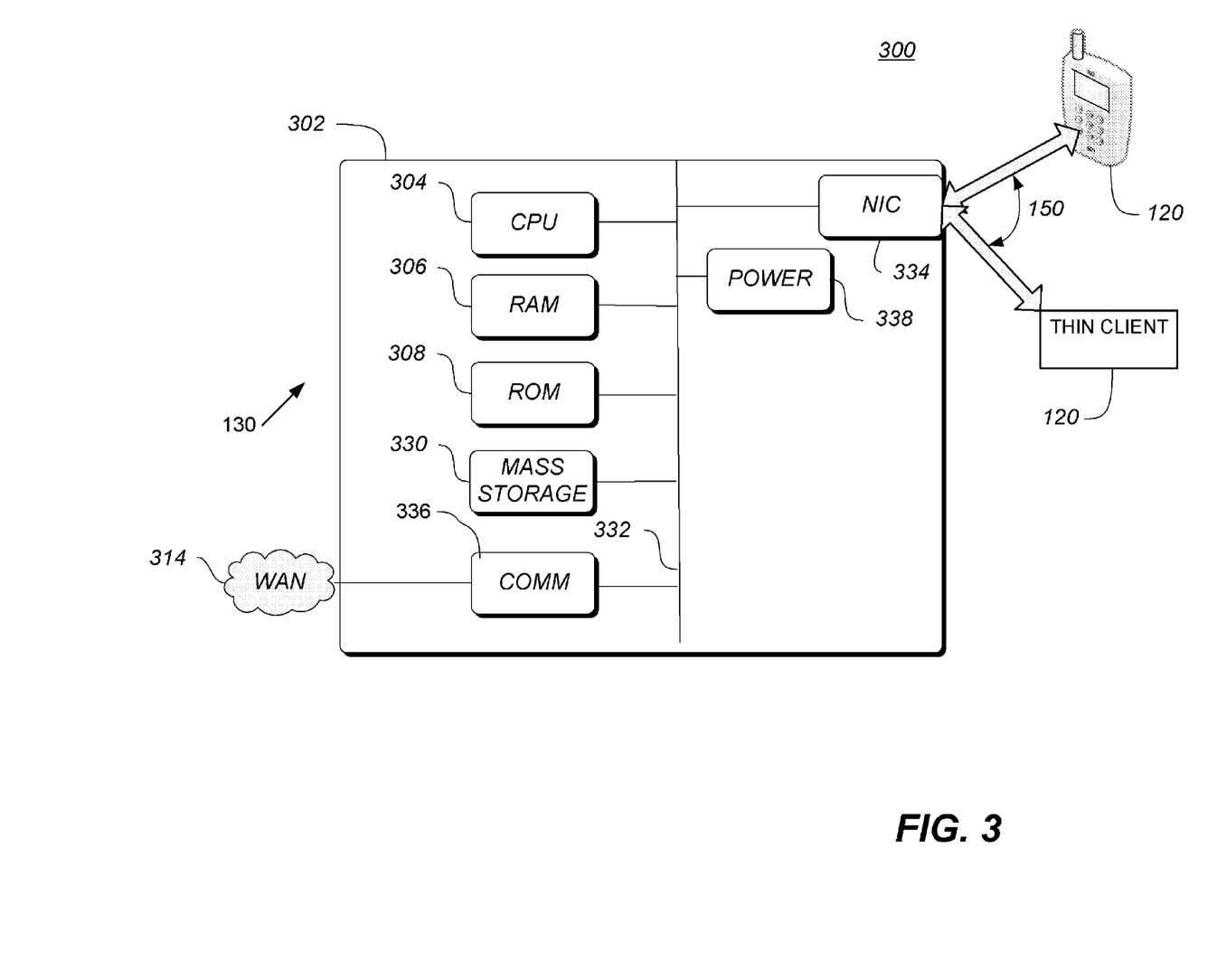
FIG. 3 illustrates a block diagram of an exemplary Smart Module communicating with a Thin Client in accordance with a possible embodiment of the invention.

FIG. 3 shows a more detailed exemplary block diagram of Smart Module 130 of FIG. 1. In the present arrangement the Smart Module 130 provides mainly the communication functionality for the Thin Clients. Thin Clients would use the communication resources of Smart Module 130 as an access point to outside devices. The Thin Client 120 could have full cellular phone functionality, but the cellular portion is not needed when used in conjunction with a Smart Module. The thin Client has certain capabilities that may be needed by the Smart Module or by other Thin Clients such as user interface capabilities and/or application capabilities. The application can be distributed among the Thin Clients for sharing when needed. Thus, exemplary Smart Module 130 may include a bus 332, a processor 302, a memory 306, a read only memory (ROM) 308, a storage device 330, an input device, an output device, and a communication interface. Bus 332 may permit communication among the components of the Smart Module 130.

The description of FIG. 3 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 302 includes a processor 304, commercially available from Intel®, Motorola®, Cyrix®, and others. Computer 302 also includes random-access memory (RAM) 306, read-only memory (ROM) 308, and one or more mass storage devices 330, and a system bus 332, that operatively couples various system components to the processing unit 304. The memory 306, 308, and mass storage devices, 330, are types of computer-accessible media. Mass storage devices 330 are more specifically types of nonvolatile computer-accessible media and can include one or more hard disk drives, floppy disk drives, optical disk drives, and tape cartridge drives. The processor 304 executes computer programs stored on the computer-accessible media. Computer 102 also includes power supply 138. Each power supply can be a battery.

Computer 302 can be communicatively connected to a wide area network ("WAN") 314, such as a wireless network, via a communication device 336. WAN 314 connectivity is well known within the art. Communication device 336 could also be an Ethernet® or similar hardware network card connected to a local-area network (LAN) that itself is connected to the Internet via what is known in the art as a "direct connection" (e.g., T3 line, etc.). Communication device 334 is a communication channel from the Smart Module to the Thin Client 120 over a short range wireless technology such as Bluetooth® and 802.11.

A user enters commands and information into the computer 302 through input devices (not shown) such as a keyboard or a pointing device. The keyboard permits entry of textual information into computer 302, as known within the art, and embodiments are not limited to any particular type of keyboard. Pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls, and point sticks. Other input devices (not shown) can include a microphone, joystick, game pad, satellite dish, scanner, or the like.

In some embodiments, computer 302 is optionally coupled to a display device. Display device would be connected to the system bus 332. Display device permits the display of information, including computer, video and other information, for viewing by a user of the computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers (not shown) provide audio output of signals. Speakers can also be connected to system bus 332.

Computer 302 also includes an operating system (not shown) that is stored on the computer-accessible media RAM 306, ROM 308, and mass storage device 330, and is executed by the processor 304. Examples of operating systems include Microsoft Windows®, Apple MacOS®, Linux®, UNIX®. Examples are not limited to any particular operating system, however, and the construction and use of such operating systems are well known within the art.

Embodiments of computer 302 are not limited to any type of computer 302. In varying embodiments, computer 302 comprises a PC-compatible computer, a MacOS®-compatible computer, a Linux®-compatible computer, or a UNIX®-compatible computer. The construction and operation of such computers are well known within the art.

Computer 302 can be operated using at least one operating system to provide a graphical user interface (GUI) including a user-controllable pointer. Computer 302 can have at least one web browser application program executing within at least one operating system, to permit users of computer 302 to access an intranet, extranet or Internet world-wide-web pages as addressed by Universal Resource Locator (URL) addresses. Examples of browser application programs include Netscape Navigator® and Microsoft Internet Explorer®.

The computer 302 can operate in a networked environment using logical connections to one or more Thin Client 120 or other smart modules. These logical connections are achieved by a communication device coupled to, or a part of, the computer 302. The Thin Clients communicate (communication link 150) with the Smart Module 130 over short range wireless technology such as Bluetooth®, IEEE 802.11 compliant channels. A single thin client could be a dumb handset, containing the display and audio user interface, etcetera, or that functionality could be divided among multiple thin clients. Embodiments are not limited to a particular type of communications device. The Thin Client 120 can be another wireless communication device, a network PC, a client, a peer device, keyboard, tablet computer, headset, or other common network node. Such common network nodes are commonplace in offices, enterprise-wide computer networks, intranets, extranets and the Internet.

The hardware and the operating environment illustrated in FIG. 3 and the related discussion are intended to provide a brief, general description of a suitable computing environment in which the invention may be implemented. Although not required, the invention will be described, at least in part, in the general context of computer-executable instructions, such as program modules, being executed by the, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The distributed architecture for personalizing alert preferences 100, Thin Client 120, and Smart Module 130 illustrated in FIGS. 1-3 and the related discussion are intended to provide a brief, general description of a suitable computing environment in which the invention may be implemented. Although not required, the invention will be described, at least in part, in the general context of computer-executable instructions, such as program modules, being executed by computer 302 and processor 220 of Thin Client 120. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 4:
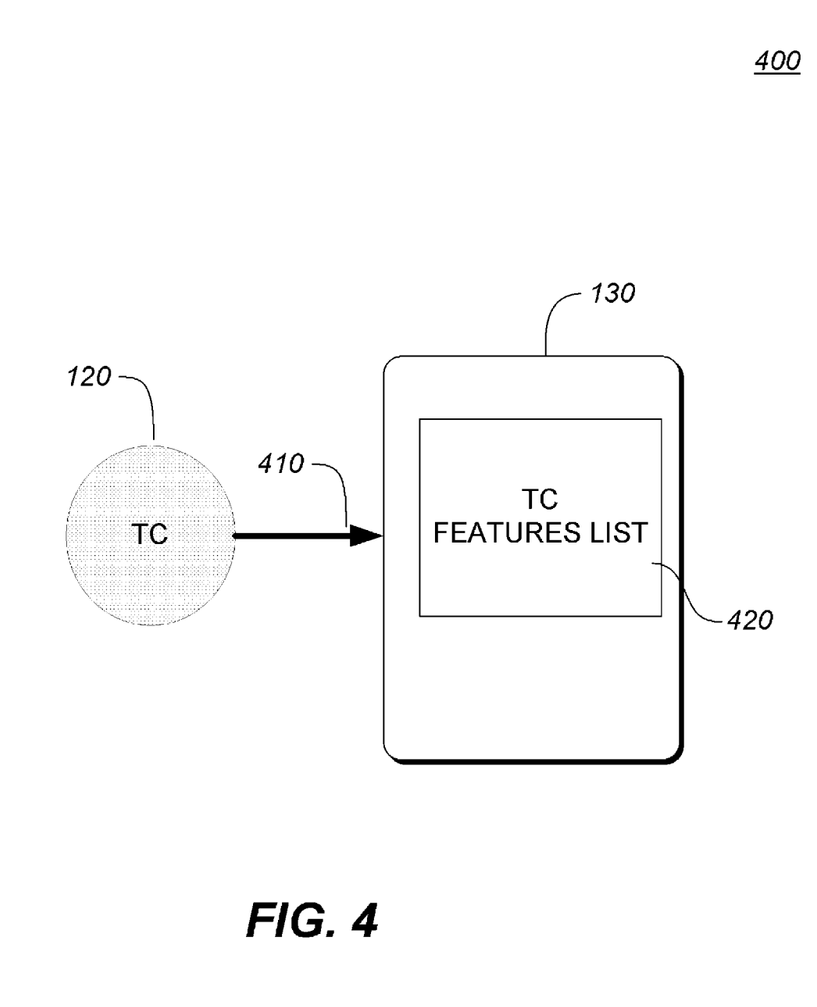
FIG. 4 illustrates a transfer of alert capabilities from Thin Client to Smart Module in accordance with a possible embodiment of the invention.

FIG. 4 illustrates a transfer of alert capabilities 400 from Thin Client to Smart Module in accordance with a possible embodiment of the invention.

In this embodiment, the alert preferences for a Thin Client are personalized. For example, when a user switches from a work-based phone handset to their gym-based display-less music-player handset, an alert that was provided using a visual cue (e.g., flashing pop-up dialog) on the former will fail in the latter due to the lack of a display. What is really required is the ability for the user to correlate a visual cue on the first device (TC1) to an audio alert on the second device (TC2) and transfer the default setting on TC1, pop-up then disappear after 5 seconds, to a default setting on TC2, beep continuously for 5 seconds, then once every 30 seconds for 2 minutes. A way to customizing alert preferences for a device is to provide the user with custom alert settings menu that can be viewed and modified on any device that has display capabilities.

Alert capabilities transfer from the Thin Client 120 to Smart Module 130 on first contact. Every new TC owned or in the possession of the user must now register 410 its capabilities with SM 130 either on a persistent basis (one time registration) or on a lease-driven basis (transient). Persistent registration allows the SM 130 to cache capabilities for frequently used devices, while the transient allows the SM 130 to also incorporate borrowed devices that may be with the user for only a short period of time. Note that the persistent versus transient nature of the capabilities can be achieved using a time-to-live (TTL) parameter on the capabilities where the TTL is infinitely large (years) for persistent devices and of smaller duration (hours) for transient devices. When the TTL expires, the TC 120 must re-register, thus enabling the SM 130 to become aware of new capabilities or upgraded capabilities to device.

The Smart Module 130 stores the feature list 420 for each Thin Client. These feature lists describe the capabilities of each device, as well as the tunability, range of parameter settings, which can be associated with each capability.

The SM 130 constructs a custom alert settings menu based on the TC capabilities. As it is well known to those in the art, menus can be generated from data and fields that form the menu data that can then be arranged in any desired manner so as to be displayed on a user interface. Preferably, the user interface comprises a display engine having an associated series of forms, e.g. Hypertext Mark-up Language (HTML) and/or Extensible Mark-up Language (XML) files, which when viewed on the data collection device represent individual sections of the equivalent paper based alert capabilities forms for the Thin Client. It will be appreciated that more than one section for entering and/or viewing alert capabilities data may be included in a single file and concurrently displayed. The mark-up tells the display engine how to display text and images for the user. Each individual mark-up code is referred to as an element or tag. Some elements come in pairs that indicate when some display effect is to begin and when it is to end. XML is a flexible way to create common information formats and share both the format and the data on the World Wide Web, intranets, and elsewhere.

The generated custom alert settings menu may be shown for example on the Smart Module, on the Thin Client, or a second Thin Client having a display. The user can now select from among the alert settings supported by TC 120. In particular, the user can associate a specific capability on the device with a specific alert behavior such as "beep" for call, "ring" for caller ID, and can specify a default setting for that capability. Additionally, if a new device registers and its capabilities are similar to that provided in one or more of the previously registered devices, then the new device may assume the default mappings and settings associated with the previously registered device(s). This lessens the burden on the user, requiring him/her to only override those settings that are specifically to be different on the new device. If the new device has both similar capabilities and additional capabilities compared to the previously registered devices, the user may be given the choice to keep the similar capability or change to a new capability. The "new" TC is able to assume the capabilities of a similar registered device, wherein alert preferences for the device may assume default mappings and settings associated with the generated list of all registered devices that have similar alert capabilities and wherein assumed default mappings and settings associated with the generated list of all registered devices that have similar alert capabilities can be supplemented with additional capabilities for the device.

Since the user is permitted to view and edit the custom alert settings menu each TC gets personalized as defined by the user.

Figure 5:
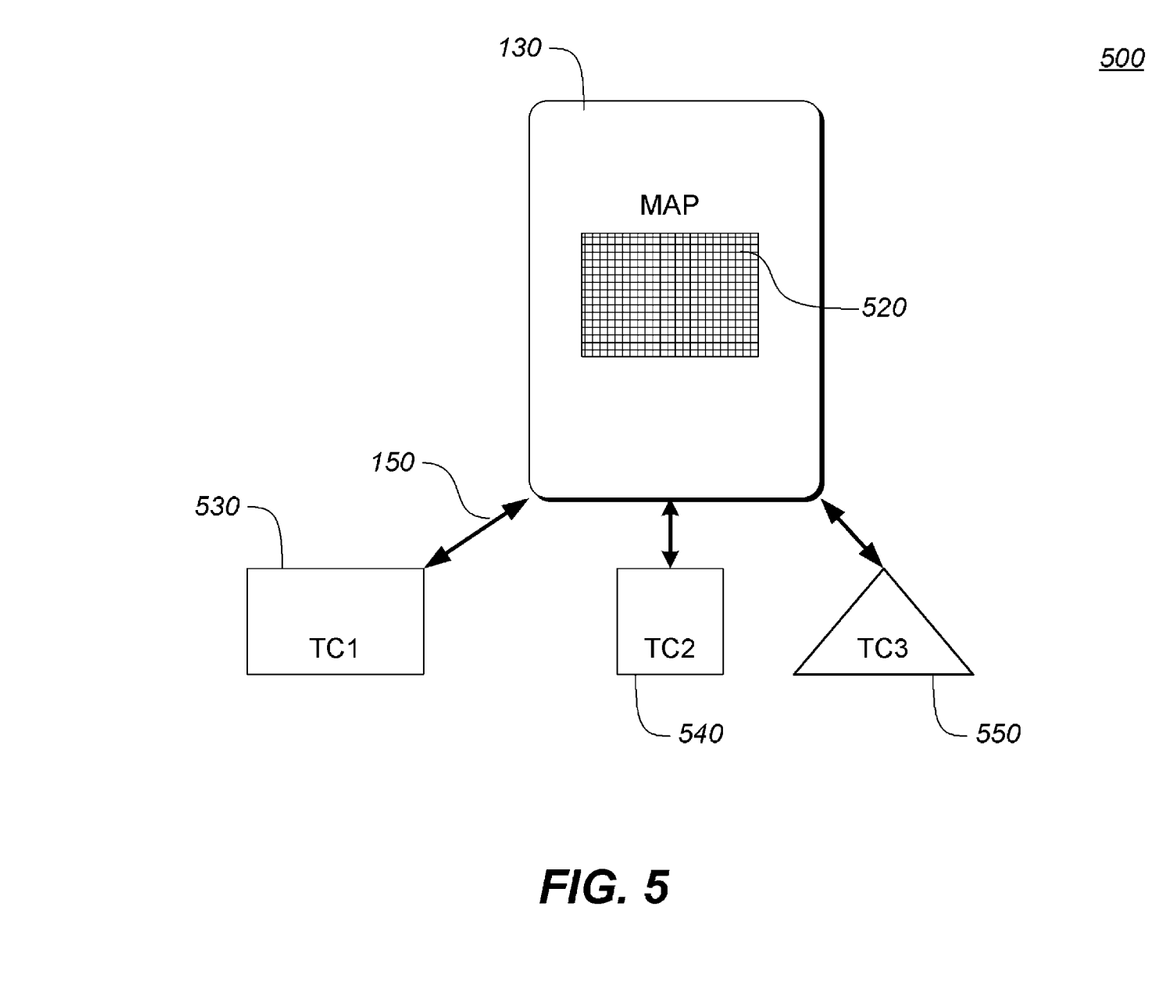
FIG. 5 illustrates a configuration for mapping alert capabilities at the Smart Module accordance with a possible embodiment of the invention.

FIG. 5 illustrates a configuration for mapping alert capabilities 500 at the Smart Module accordance with a possible embodiment of the invention In this embodiment, the alert preferences for a Thin Client are personalized by having the Smart Module map each function. Alert capabilities transfer from the Thin Client 120 to Smart Module on first contact. The Smart Module stores the feature list for each Thin Client. For example Thin Client 1 (TC1) 530, Thin Client 2 (TC2) 540, and Thin Client 3 (TC3) 550 all register their alert capabilities with Smart Module 130. The smart module can use storage devices such ROM 308, mass storage 330, or RAM 306 for storing the feature list for the devices (TC1 . . . TC3) associated with a user. For example, mass storage 330 or ROM 308 can be used to maintain the feature list for persistent devices. RAM 308 can be used for transient devices or with devices that have a time-to-live (TTL) parameter Table 1 is an exemplary feature list.

TABLE 1

Thin Client Alert Capabilities

|  | TC1 | TC2 | TC3 |
|---|---|---|---|
| Display | X |  | X |
| Vibrator | X | X | X |
| Flashing lights |  |  | X |
| Polyphonic ringtone |  | X | X |
| Video ringtone |  |  | X |

The columns of Table 1 represent the Thin Clients (1 ... N) while the rows represent the rows represent the alert capabilities. For example, the table shows that TC3 and TC1 have display and vibrator alert capabilities. While TC2 has polyphonic ringtone and vibrator alert capabilities.

The user can set alert preferences with a device having display capabilities. The entered preferences will be maintained in a suitable storage device such as mass storage 330 in FIG. 3. The entered preferences can be based on a class or a special designation for how to alert the user under various circumstances. For example, the entered preferences from a user can range from intrusive to unobtrusive. The user can then designates which alert capabilities are intrusive and which are unobtrusive. The preferences are stored in the Smart Module, but may be entered and/or viewed using the user interface of other devices.

The Smart Module 130 creates a map 520 of the alert capabilities for the Thin Clients (1 ... N) and the entered alert preferences from the user. An example of such a map 520 is shown below in Table 2. The user has access to the map and to change the alert settings for each and all devices in the map.

TABLE 2

Alert Mapping in Smart Module

| | | TC1 | TC2 | TC3 |
|---|---|---|---|---|
| Unobtrusive ↑ ↓ Obnoxious | Silent Mode | Display | Vibrator | |
| | Meeting Mode | Vibrator | Vibrator | |
| | Normal Mode | Vibrator | Polyphonic ringtone | |
| | Loud Mode | Display & Vibrator | Vibrator & Polyphonic ringtone | Vibrator & Flashing lights & Video ringtone |

The Smart Module determines the alert settings for each Thin Client (TC1 ... TC3) based on the mapping. The settings are maintained or stored in a suitable storage device in the Smart Module and upon connection to the Smart Nodule 130 they transferred to Thin Client 120. Alternatively, if the user changes a setting on one TC, for example TC1 to Loud Mode, the user may be prompted on whether the change is only for that device or all devices such in the Galaxy family of devices. Alternately, the change may automatically ripple to all devices unless the user has previously "locked" in a setting, for example TC3 is always Silent Mode.

The Smart Module determines the alert settings for each Thin client based on the mapping and sends it to the Thin Clients as needed. Alternatively, if the user changes a setting on one TC, for example TC1 to Loud Mode, the user may be prompted on whether the change is only for that device or all devices such in the Galaxy family of devices. Alternately, the change may automatically ripple to all devices unless the user has previously "locked" in a setting, for example TC3 is always Silent Mode.

Figure 6:
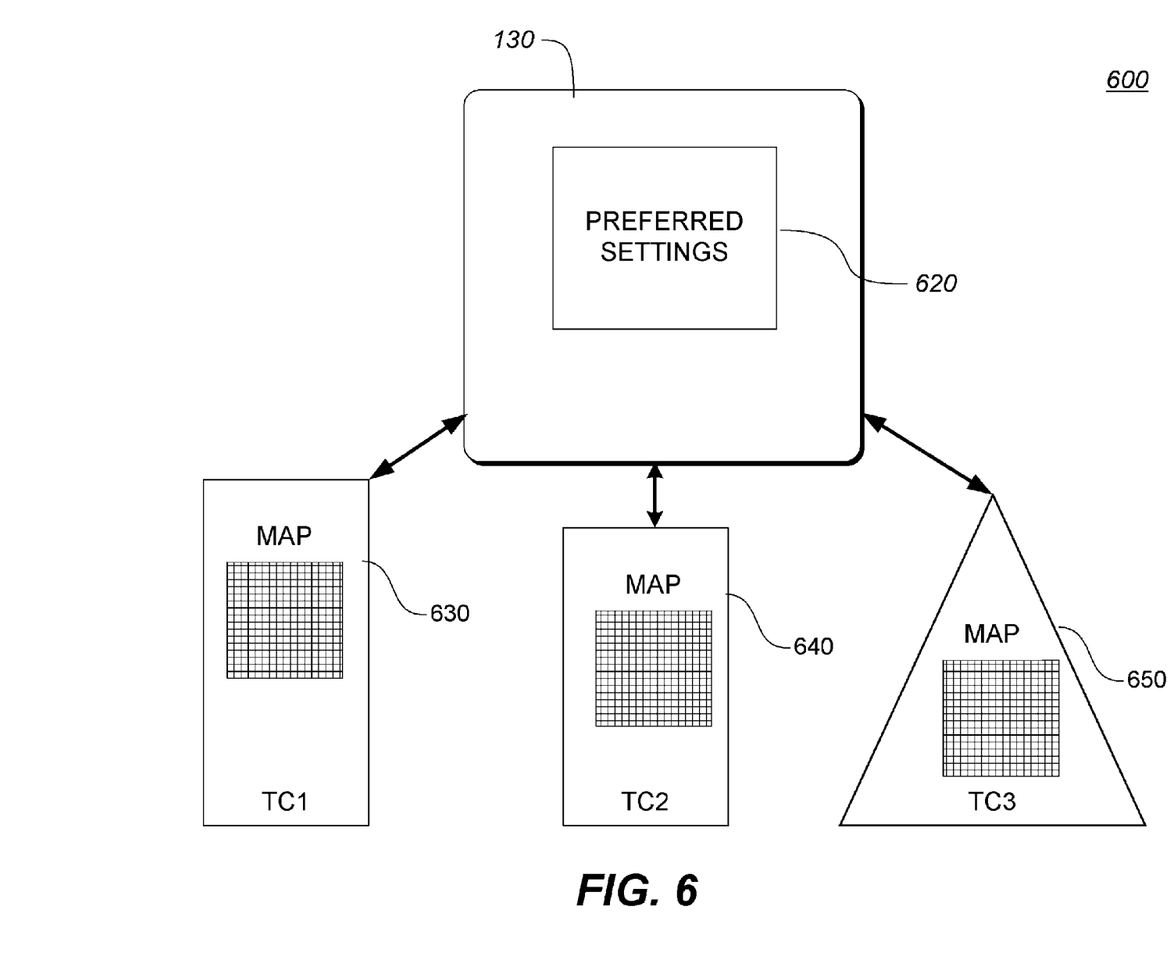
FIG. 6 illustrates a configuration for mapping alert capabilities at the Thin Client accordance with a possible embodiment of the invention.

FIG. 6 illustrates a configuration for mapping alert capabilities 600 the Thin Client such as Thin Client 120 in accordance with a possible embodiment of the invention. If the function selected by the Smart Module is available on the Thin Client, that feature is used. If not available, a similar alert type is chosen based on the mapping done in the Thin Client.

Each Thin Client has a set of default alert preferences. There may be a single default, example always default to vibrator, or a default based on alert class. For example, the default unobtrusive mode setting is vibrator and the default normal mode setting is polyphonic ringer. The Thin Client contains a mapping of what alert type based on the Smart Module requested alert. TC1 has a first map 630, TC2 ha a second map 640, and TC3 has a third map 650, that can be individually tailored for the type of thin client or a universal map promulgated by smart module 130. The user may select the default alert preferences. The user may select the alert preference for a single device or for a plurality of devices.

The Smart Module 130 sends the Thin Client an alert request. The request may be an alert class (e.g. unobtrusive or loud) and/or preference(s). The request may have multiple preferences in order of preference (e.g. first choice is vibrator, second choice is flashing lights). The preferred setting 630 can be structure as shown in Table 2 where there is an alert class (Unobtrusive) with a rank order of preferences for satisfying the alert class.

TABLE 3

Alert Preference Message from SM to TC

| Alert Class | Preference 1 | Preference 2 |
|---|---|---|
| Alert Class: Unobtrusive | Preference 1: Vibrator | Preference 2: Silent Display |

The Thin Client (TC1 ... TC3) enables the alert preference requested by the Smart Module 130 if supported.

If the alert preference requested by the Smart Module 130 is unsupported by the TC, the TC selects the appropriate alert type based on its local alert mapping. The Thin Client looks at the rank order of alert preferences send by SM with the request in order to arrive at a suitable alternative. In the simplest case, a single default (e.g., vibrator) is always selected no matter what the SM requests. Even when same function is selected, there could be differences among devices. For example, all Thin Clients could change to a polyphonic ringtone such as MP3 ringtone, but the actual MP3 clip could be unique to the Thin Client.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 7:
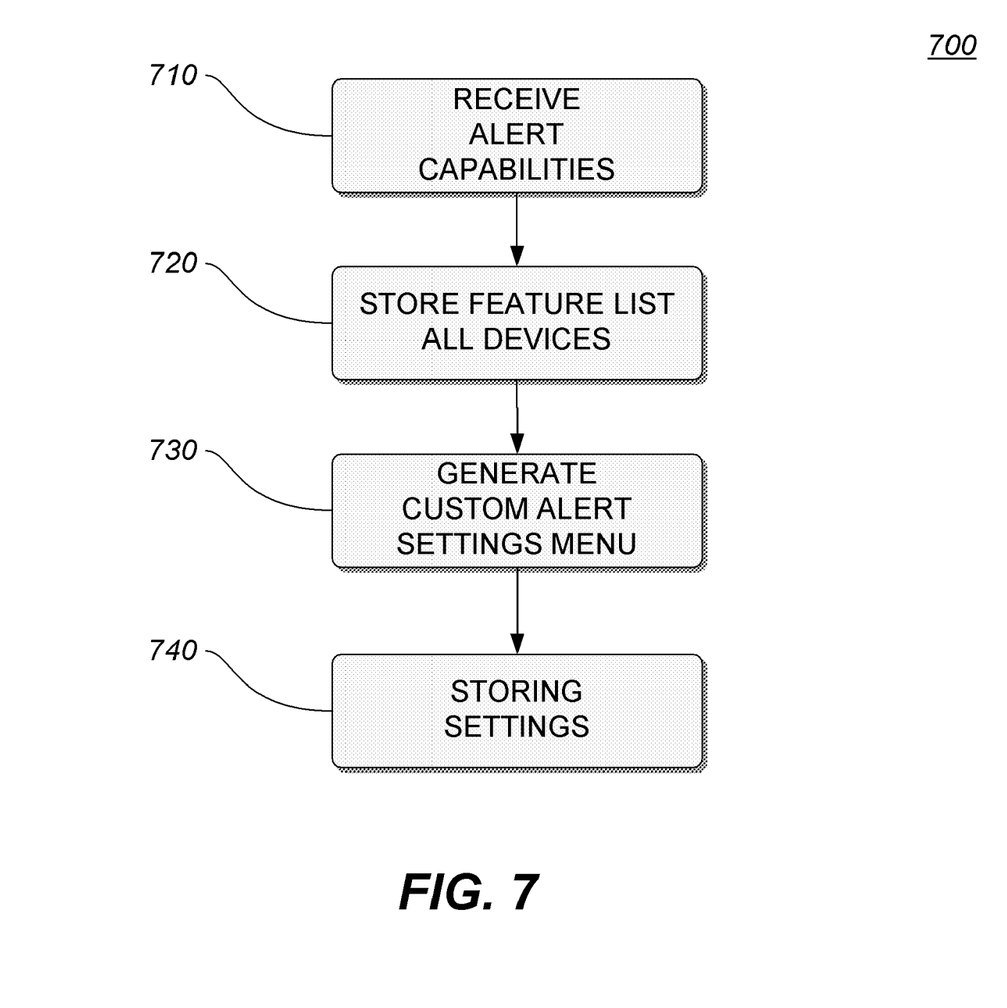
FIG. 7 is an exemplary flowchart illustrating one possible process for generating custom alert settings menu in accordance with one possible embodiment of the invention.

FIG. 7 is an exemplary flowchart illustrating some of the basic steps associated with a custom alert settings menu process in accordance with a possible embodiment of the invention. The process begins at step 710 with the smart module 130 listening for a Thin Client 120 wishing to register, the Smart Module 130 maintains a store list of all registered Thin Clients and their capabilities. Finally, the process takes all the data received from the Thin Client wishing to register and all the thin clients that are registered.

At step 710, the process begins with receiving identifier information from a device (TC) representing a request to register the device for alert preferences, wherein the device has at least one alert capability.

At step 720, the process continues with the storing the received identifier information in a storage device associated with a feature list for all registered devices, wherein the feature list comprises alert capabilities and range for parameter settings The process goes to step 730 and ends by generating a custom alert settings menu for the device based on the at least one alert capability. The generate custom alert settings menu can be viewed at the smart module or at a Thin Client provided that it has display capabilities. In step 740 the settings are stored in the Smart Module 130 for later viewing, editing, and transferring to Thin Clients upon connection, or when needed.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the in FIGS. 1-6 each processing the content in various possible ways. It does not necessarily need to be one system used by all end users. Accordingly, the appended claims and their legal equivalents should only define the invention, rather than any specific examples given.

We claim:

1. A method of customizing at least one preference for an external device of a plurality of devices using custom menus, the method comprising:

receiving, in a first device, over a short range communication channel between the first device and the external device of the plurality of devices, identifier information from the external device representing a request to register the at least one preference for the external device, wherein the external device has at least one capability that is different from other registered devices of the plurality of devices;

storing the received identifier information in a storage device of the first device, the storage device storing a feature list for each of a plurality of registered devices of the plurality of devices, wherein the feature list comprises settings and range for parameter settings;

generating in the first device a custom alert settings menu for the external device of the plurality of devices based on the at least one capability, the custom alert settings menu including settings corresponding to the capabilities and parameter settings of the external device;

displaying the custom alert settings menu on a user interface;

receiving alert preferences for the at least one external device of the plurality of devices, wherein the alert preferences are selected from the custom alert settings menu and are stored in the storage device;

creating a map of alert capabilities and parameters from the feature list and the received alert preferences; and providing the map to at least one device of the plurality of devices.

2. The method of claim 1, the method further comprising: generating a list of all registered devices that have similar capabilities as the external device.

3. The method of claim 2, wherein a user views the generated custom alert settings menu on one or more other devices, a smart module, or the external device.

4. The method of claim 3, wherein alert preferences for the external device are associated with specific alert behavior from the generated custom alert settings menu.

5. The method of claim 4, wherein alert preferences for the external device assumes default mappings and settings associated with the generated list of all registered devices that have similar capabilities.

6. The method of claim 5, wherein assumed default mappings and settings associated with the generated list of all registered devices that have similar capabilities is supplemented with additional capabilities for the external device.

7. The method of claim 5, the method further comprising:
caching alert capabilities for frequently used devices; and
assigning a time to live parameter to less frequently used devices.

8. An apparatus for mapping alert capabilities for a plurality of devices including at least one external device, comprising:
- a memory to store a feature list for the plurality of devices, wherein the feature list comprises different alert capabilities and parameter settings for each of the plurality of devices;
- at least one short range communication interface providing a communication channel between the apparatus and the at least one external device;
- a wireless wide area network communication interface providing communication functionality over a wide area network for the at least one external device of the plurality of devices; and
- a processor operative to
- construct a custom alert settings menu for the at least one external device of the plurality of devices, the custom alert settings menu including alert settings corresponding to the alert capabilities and the parameter settings of the at least one external device of the plurality of devices,
- display the custom alert settings menu on a user interface,
- receive alert preferences for the at least one external device of the plurality of devices, wherein the alert preferences are selected from the custom alert settings menu and are stored in memory,
- create a map of alert capabilities and parameters from the feature list and the received alert preferences, and
- provide the map to at least one device of the plurality of devices.

9. The apparatus of claim 8, wherein the alert preferences from a user range from intrusive to unobtrusive, wherein intrusive is loud mode while unobtrusive is silent mode.

10. The apparatus of claim 9, wherein an alert preference from a user include locking in a setting for a device.

11. The apparatus of claim 8,
wherein the user interface displays the created map to a user, wherein the user edits the created map of alert capabilities through the user interface,
wherein edits to the created map of alert capabilities are stored in the storage device.

12. The apparatus of claim 8, wherein a user is prompted to indicate if an edit applies to all devices or only to a specific device.

13. The apparatus of claim 12, wherein the least one short range communication interface broadcasts the alert settings to all affected devices.

14. An electronic device for handling alert requests, comprising:
- a user interface;
- a storage device for maintaining a set of custom default alert preferences and a local mapping of alert type based on an external device requested alert, wherein the external device is a device of a plurality of external devices, wherein the custom default alert preferences comprise a single default or based on an alert class, wherein the storage device maintains a feature list for each of the plurality of external devices, wherein the feature list comprises alert capabilities and a range for parameter settings, and each of the external devices comprise different alert capabilities, and wherein the preferences are received for each of the plurality of external devices;
- at least one short range communication interface providing a communication channel between the electronic device and the external device of the plurality of external devices;
- a wireless wide area network communication interface providing communication functionality over a wide area network for the external device of the plurality of external devices;
- a processor coupled to the storage device; and
- software means operative on the processor for:
  - processing an alert request based on the maintained default alert preferences and the maintained local mapping of alert type,
  - constructing a custom alert settings menu for the external device of the plurality of devices, the custom alert settings menu including alert settings corresponding to the alert capabilities and the range for parameter settings of the external device of the plurality of external devices,
  - displaying the custom alert settings menu on the user interface,
  - receiving alert preferences for the external device of the plurality of external devices, where the alert preferences are selected from the custom alert settings menu and are stored in the memory,
  - creating a map of alert capabilities and parameters from the feature list and the received alert preferences, and
  - providing the map to at least one device of the plurality of external devices.

15. The electronic device of claim 14, wherein the user interface comprises an interface for allowing a user to select a default preference from the set of default preferences maintained in the storage device.

16. The electronic device of claim 15, wherein the least one short range communication interface comprises a communication interface for receiving alert request from external devices.

17. The electronic device of claim 16,
wherein the alert request comprises an alert class;
wherein the alert request comprises multiple ranked alert preferences.

18. The electronic device of claim 17, the software means further performing: enabling the alert request from the external device if supported from the set of default preferences.

19. The electronic device of claim 18, the software means further performing: selecting an appropriate alert type based on the local mapping of alert type.

* * * * *